(12) United States Patent
Keller et al.

(10) Patent No.: US 10,188,982 B2
(45) Date of Patent: Jan. 29, 2019

(54) METHOD AND INDUSTRIAL PLANT FOR OBTAINING HELIUM FROM A HELIUM-CONTAINING FEED GAS

(71) Applicant: LINDE AKTIENGESELLSCHAFT, Munich (DE)

(72) Inventors: Tobias Keller, Feldkirchen-Westerham (DE); Christian Voss, Geretsried (DE); Martin Bauer, München (DE); Frank Jennewein, München (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/482,914

(22) Filed: Apr. 10, 2017

(65) Prior Publication Data

US 2017/0312682 A1 Nov. 2, 2017

(30) Foreign Application Priority Data

Apr. 28, 2016 (EP) .................................... 16000961

(51) Int. Cl.
*B01D 53/22* (2006.01)
*C01B 23/00* (2006.01)
*B01D 53/047* (2006.01)

(52) U.S. Cl.
CPC ......... *B01D 53/229* (2013.01); *B01D 53/047* (2013.01); *C01B 23/0042* (2013.01);
(Continued)

(58) Field of Classification Search
CPC .. B01D 53/047; B01D 53/226; B01D 53/229; B01D 2256/18; B01D 2257/304;
(Continued)

(56) References Cited

U.S. PATENT DOCUMENTS 4,690,695 A * 9/1987 Doshi .................. B01D 53/047
95/100
4,717,407 A * 1/1988 Choe .................... B01D 53/229
210/500.21

(Continued)

FOREIGN PATENT DOCUMENTS

CA 2183832 A1 2/1997
DE 102007022963 A1 11/2008
(Continued)

*Primary Examiner* — Jason M Greene
(74) *Attorney, Agent, or Firm* — Millen White Zelano & Branigan, PC

(57) ABSTRACT

A method of obtaining helium from a helium-containing feed gas. Helium-containing feed gas is fed to a prepurifying unit that uses a pressure swing adsorption process to remove undesirable components from the helium-containing feed gas and obtain a prepurified feed gas. The prepurified feed gas is fed to a membrane unit connected downstream of the prepurifying unit and that has at least one membrane more readily permeable to helium than to at least one further component present in the prepurified feed gas. A pressurized low-helium retentate stream that has not passed through the membrane is fed to the prepurifying unit. The pressurized low-helium retentate is used to displace helium-rich gas from an adsorber that is to be regenerated into an already regenerated adsorber.

21 Claims, 5 Drawing Sheets

(52) U.S. Cl.
CPC .... *C01B 23/0052* (2013.01); *B01D 2253/102* (2013.01); *B01D 2253/108* (2013.01); *B01D 2256/18* (2013.01); *B01D 2257/102* (2013.01); *B01D 2257/302* (2013.01); *B01D 2257/304* (2013.01); *B01D 2257/504* (2013.01); *B01D 2257/702* (2013.01); *B01D 2257/7025* (2013.01); *B01D 2257/80* (2013.01); *B01D 2259/40022* (2013.01); *B01D 2259/40039* (2013.01); *B01D 2259/40052* (2013.01); *B01D 2259/40054* (2013.01); *B01D 2259/40056* (2013.01); *B01D 2259/4068* (2013.01); *B01D 2259/40075* (2013.01); *B01D 2259/40086* (2013.01); *C01B 2210/007* (2013.01); *C01B 2210/0031* (2013.01); *C01B 2210/0051* (2013.01); *C01B 2210/0062* (2013.01); *C01B 2210/0064* (2013.01); *Y02C 10/08* (2013.01); *Y02C 10/10* (2013.01); *Y02C 20/20* (2013.01); *Y02P 20/152* (2015.11); *Y02P 20/156* (2015.11)

(58) Field of Classification Search
CPC ........ B01D 2257/504; B01D 2257/702; B01D 2257/80; B01D 2259/40086
See application file for complete search history.

(56) References Cited

U.S. PATENT DOCUMENTS

| 4,765,804 | A | * | 8/1988 | Lloyd-Williams | B01D 53/229 95/54 |
| 5,632,803 | A | * | 5/1997 | Stoner | B01D 53/229 95/101 |
| 2004/0216609 | A1 | | 11/2004 | Baksh et al. | |
| 2004/0237789 | A1 | | 12/2004 | Baksh et al. | |
| 2005/0000354 | A1 | * | 1/2005 | Monereau | B01D 53/047 95/96 |
| 2005/0011353 | A1 | * | 1/2005 | Shirley | B01D 53/047 95/45 |
| 2005/0217479 | A1 | * | 10/2005 | Hale | B01D 53/228 95/53 |
| 2016/0115029 | A1 | * | 4/2016 | Van Leuvenhaege | B01D 53/229 423/262 |
| 2016/0231051 | A1 | * | 8/2016 | Shah | B01D 53/229 |
| 2017/0320736 | A1 | * | 11/2017 | Voss | B01D 53/229 |

FOREIGN PATENT DOCUMENTS

| EP | 0684066 A2 | 11/1995 | |
| EP | 0945163 A1 | 9/1999 | |
| GB | 2160439 A | * 12/1985 | ............. B01D 53/22 |

* cited by examiner

|  | T1 | T2 | T3 | T4 | T5 | T6 | T7 | T8 | T9 | T10 | T11 | T12 |
|---|---|---|---|---|---|---|---|---|---|---|---|---|
| Ads1 | A1 | A2 | E1 | E2B | E3B | S1 | D1 | P1 | R3 | R2 | R1 | R0 |
| Ads2 | R1 | R0 | A1 | A2 | E1 | E2B | E3B | S1 | D1 | P1 | R3 | R2 |
| Ads3 | R3 | R2 | R1 | R0 | A1 | A2 | E1 | E2B | E3B | S1 | D1 | P1 |
| Ads4 | D1 | P1 | R3 | R2 | R1 | R0 | A1 | A2 | E1 | E2B | E3B | S1 |
| Ads5 | E3B | S1 | D1 | P1 | R3 | R2 | R1 | R0 | A1 | A2 | E1 | E2B |
| Ads6 | E1 | E2B | E3B | S1 | D1 | P1 | R3 | R2 | R1 | R0 | A1 | A2 |
| $t_{PSA}$ | 50 | 100 | 50 | 100 | 50 | 100 | 50 | 100 | 50 | 100 | 50 | 100 |
| $t_{cum}$ | 50 | 150 | 200 | 300 | 350 | 450 | 500 | 600 | 650 | 750 | 800 | 900 |
| $P_{Ads1}$ | 40.0 | 40.0 | 36.0 | 31.0 | 24.0 | 10.0 | 1.5 | 1.5 | 12.5 | 30.5 | 35.5 | 40.0 |
| $P_{Ads2}$ | 35.5 | 40.0 | 40.0 | 40.0 | 36.0 | 31.0 | 24.0 | 10.0 | 1.5 | 1.5 | 12.5 | 30.5 |
| $P_{Ads3}$ | 12.5 | 30.5 | 35.5 | 40.0 | 40.0 | 40.0 | 36.0 | 31.0 | 24.0 | 10.0 | 1.5 | 1.5 |
| $P_{Ads4}$ | 1.5 | 1.5 | 12.5 | 30.5 | 35.5 | 40.0 | 40.0 | 40.0 | 36.0 | 31.0 | 24.0 | 10.0 |
| $P_{Ads5}$ | 24.0 | 10.0 | 1.5 | 1.5 | 12.5 | 30.5 | 35.5 | 40.0 | 40.0 | 40.0 | 36.0 | 31.0 |
| $P_{Ads6}$ | 36.0 | 31.0 | 24.0 | 10.0 | 1.5 | 1.5 | 12.5 | 30.5 | 35.5 | 40.0 | 40.0 | 40.0 |

Fig. 3

METHOD AND INDUSTRIAL PLANT FOR OBTAINING HELIUM FROM A HELIUM-CONTAINING FEED GAS

The invention relates to a method and to an industrial plant for obtaining helium from a helium-containing feed gas.

Helium is of great significance for many applications, but is generally only available in low concentration, for example in natural gas or purge gases from various production methods. Since helium is a finite raw material, methods by which helium can be obtained or recovered are of increasing economic significance. Promising new methods are membrane methods or combined membrane-pressure swing adsorption methods, which enable inexpensive and reliable production of high-purity helium. The membranes should be protected here from undesirable components which can adversely affect the performance data and lifetime of the membranes by a suitable pretreatment of the feed gas. Undesirable components are, for example, higher hydrocarbons (HHC), water ($H_2O$), hydrogen sulphide ($H_2S$) or carbon dioxide ($CO_2$).

Typically, the pretreatment of the feed gas, i.e. the removal of the undesirable components, is effected by means of complex method steps, for example a scrubbing operation, a temperature swing adsorption, the use of a cryogenic unit or a combination of the aforementioned pretreatment methods. In this context, as well as the significant capital costs, a significant level of cost and inconvenience is involved in the workup and provision of the scrubbing agent, the heat of regeneration or the refrigeration.

US 2014/0243574 A1 describes a method of obtaining helium from a feed gas. In this method, the feed gas is sent to a first membrane separation stage. This separates the feed gas into a first permeate stream containing a high proportion of helium, and a first retentate stream. The first permeate stream is combined with a third permeate stream upstream of a compressor and, after the compression, sent to a second membrane separation stage. This separates the compressed gas into a second permeate stream and a second retentate stream. The second retentate stream is sent to a third membrane separation stage that separates it into the third permeate stream and a third retentate stream. The first and third retentate streams are then combined in order to form a natural gas stream.

US 2015/0182908 A1 describes a method of separating a gas mixture having a small proportion of a first gas and a main proportion of a second gas. A first gas mixture is separated with the aid of a first membrane separation stage into a first permeate and a first retentate. In a second membrane separation stage, a second gas mixture is separated into a second permeate and a second retentate, with easier permeation of the first gas through the membrane separation stages compared to the second gas. The second permeate is divided into a first proportion and a second proportion, the first proportion of the second permeate forming a first product gas wherein the main proportion is the first gas, and the second retentate forming a second product gas wherein the main proportion is the second gas. The first permeate is compressed together with the second proportion with the aid of a compressor, in order to form the second gas mixture. The first gas mixture is obtained by a combination of the second retentate with a source gas.

Against this background, one problem addressed by the present invention is that of providing an improved method.

Accordingly, a method of obtaining helium from a helium-containing feed gas is proposed. The method comprises the following steps: feeding the helium-containing feed gas to a prepurifying unit, with removal of undesirable components from the helium-containing feed gas in a pressure swing adsorption process with the aid of the prepurifying unit, in order to obtain a prepurified feed gas; feeding the prepurified feed gas to a membrane unit which is connected downstream of the prepurifying unit and has at least one membrane which is more readily permeable to helium than to at least one further component present in the prepurified feed gas; feeding a pressurized low-helium retentate stream from the membrane unit that has not passed through the at least one membrane to the prepurifying unit; and displacing helium-rich gas with the aid of the pressurized low-helium retentate stream from an adsorber to be regenerated in the prepurifying unit into an already regenerated adsorber of the prepurifying unit.

The removal of undesirable components from the helium-containing feed gas in a pressure swing adsorption process with the aid of the prepurifying unit is especially understood to mean that the undesirable components are fully or partly removed from the helium-containing feed gas. A permeate is understood to mean the proportion of a gas stream which passes through a membrane, and the retentate to mean the proportion of the gas stream which is retained by the membrane. The feed gas can also be referred to as process gas. The feed gas preferably has a high pressure of, for example, 40 bara. The feed gas may, for example, be natural gas or a purge gas from another production method. The prepurifying unit is suitable for performance of a prepurifying pressure swing adsorption method (PP PSA). Therefore, the prepurifying unit can also be referred to as PP PSA unit. The displacement of the helium-rich gas from the adsorber to be regenerated by the pressurized low-helium retentate stream is understood to mean that the helium-rich gas is forced out of the adsorber to be regenerated by the pressurized low-helium retentate stream and forced into the already regenerated adsorber. This takes place under the high pressure of the low-helium retentate stream. The helium-rich gas differs from the helium-containing feed gas because of the sorption operations and the lowering of the pressure in the E cycles in the composition.

In a pressure swing adsorption method (PSA), specific porous materials such as zeolites or activated carbon are used as adsorbent in the adsorbers. The separation effect may result here from three different principles, namely that of separation based on the equilibrium adsorption, separation based on adsorption kinetics, or separation based on a sieving effect (steric effect). In the first case, one of the components to be separated is more strongly adsorbed than another, as a result of which enrichment of the less well-adsorbed component in the gas phase takes place. In the second case, particular molecules penetrate the porous structure of the adsorbent more quickly. If the gas mixture flows through the adsorbent in a reactor bed, the component that penetrates the pores less well takes less time to flow past, and so arrives sooner at the exit from the reactor bed. In the third case, only those molecules having a smaller diameter than the pore diameter of the adsorbent are adsorbed. Molecules having a greater diameter than the pore diameter of the adsorbent pass through the adsorbent layer.

In the PSA method, the feed gas stream is introduced under elevated pressure into a fixed bed reactor filled with the adsorbent, such that the stream flows therethrough. The undesirable components of the feed gas stream are then adsorbed. At the adsorber exit, the product component can be withdrawn in concentrated form. After a while, the adsorber bed is very substantially saturated and a portion of the undesirable components exits as well. At this moment, by means of valves, the process is switched over such that the inflow of the feed gas into the laden adsorber is stopped and, instead, guided into a regenerated adsorber which then itself produces product gas. The laden adsorber has to be regenerated before it can accept feed gas again and hence also produce product gas. The adsorber is preferably regenerated at minimum pressure, meaning that the adsorber laden at elevated pressure has to be decompressed prior to the regeneration. As the pressure is lowered, the yield of the product component is increased in that a particular first proportion of the lowering of the pressure is effected overhead into a regenerated adsorber. In this way, helium-rich gas from the laden adsorber which is in the upper region of the adsorber bed of the laden adsorber because of the concentration fronts and regions which form above the adsorbent bed during the adsorption phase is stored in the regenerated adsorber and hence recovered. At the low pressure, the adsorber is regenerated, meaning that the adsorbed gas is desorbed again and obtained at the outlet. At least two alternately laden and unladen adsorbers enable continuous operation. In order to drive the excess of desorbed undesirable components out of the adsorber bed, a proportion of the product component is typically used for purging.

Through the use of the PP PSA unit, the feed gas is pretreated in just a single method step, as a result of which it is possible to dispense with the use of standard and complex pretreatment steps, for example a scrubbing operation, a temperature swing adsorption (TSA) or the use of a cryogenic unit. The membranes of the membrane unit are protected from loading or soiling with the undesirable components. Through the use of the pressurized retentate stream of the membrane unit in the PP PSA unit, it is possible to reduce the losses of the product component via the PP PSA unit to a minimum, and they are thus within the same order of magnitude as the standard aforementioned methods for pretreatment of the feed gas. By using the pressurized retentate stream in the PP PSA unit, moreover, at least partial recovery of the product component present in the retentate and hence a further increase in the overall yield are achieved. The product component can also be referred to as component of value. The product component is preferably helium.

In one embodiment, a first permeate stream is fed to the membrane unit of an He PSA device, with the aid of which the first permeate stream is purified up to a purity of helium of greater than 99.0 percent by volume.

In this way, it is possible to achieve a particularly high purity of the component of value.

In a further embodiment, the pressurized low-helium retentate stream has a pressure of 35 to 40 bara, preferably of 36 to 39 bara, further preferably of 37 bara.

As a result of this, it is possible to use the retentate stream in the adsorbers of the prepurifying unit. Compression of the retentate stream with the aid of an additional compressor is dispensable. As a result, cost savings are possible. The unit bara refers here to the absolute pressure. The preferred pressure range of the feed gas is between 5 and 60 bara. The pressure of the retentate stream which is used in the prepurifying unit, for the EB step and for the optional increase in pressure with retentate in steps R1 and/or R0, should in principle especially be as high as possible, i.e. as close as possible to the pressure of the feed gas (for example 70% of the feed gas pressure, preferably 80% of the feed gas pressure, more preferably 90% of the feed gas pressure). For the optional regeneration with retentate, more particularly, a retentate pressure of only 1% to 10% of the feed gas pressure would be sufficient because the purging in the adsorber is conducted at low pressure—preferably at about 1.5 bara. More particularly, the retentate pressure may also be 1% to 5%, preferably 1% to 20%, of the feed gas pressure.

In a further embodiment, the pressurized low-helium retentate stream is a nitrogen-rich stream, or the pressurized low-helium retentate stream is a methane-rich stream.

The nitrogen-rich stream is low in undesirable components. The nitrogen-rich stream can absorb the desorbed undesirable components from an adsorber to be regenerated. In the recovery of helium from natural gas, the pressurized low-helium retentate stream is a methane-rich stream.

In a further embodiment, the at least one further component present in the prepurified feed gas is nitrogen.

More particularly, the membranes of the membrane unit are designed such that helium diffuses more easily therethrough than nitrogen. The prepurified feed gas may also comprise further components.

In a further embodiment, the undesirable components comprise carbon dioxide, higher hydrocarbons, sulphur dioxide and/or water.

The removal of these undesirable components prevents damage to and/or a decline in performance of the membranes of the membrane unit. This increases the lifetime of the membrane unit and reduces the maintenance costs.

In a further embodiment, the pressurized low-helium retentate stream is used to regenerate an adsorber to be regenerated in the prepurifying unit and/or the pressurized low-helium retentate stream is used to increase the pressure in an adsorber to be pressurized in the prepurifying unit.

This is enabled by virtue of the retentate stream being a stream low in undesirable components. The regenerating or purging of the adsorber is preferably effected at low pressure.

In a further embodiment, only a substream of the pressurized low-helium retentate stream is used.

A further substream of the permeate stream can be utilized thermally, for example, especially flared off.

In a further embodiment, the displacement of the helium-rich gas with the aid of the pressurized low-helium retentate stream is preceded by release of helium-rich gas by an adsorber to be regenerated to an already regenerated adsorber.

At the end of the adsorption, a significant proportion of the component of value is still present in the adsorber to be regenerated. If at all possible, this proportion should not be lost but should be recovered in order to increase the yield of the PP PSA unit. For this purpose, the adsorber to be regenerated preferably releases gas via a valve overhead to the already regenerated adsorber and hence stores a certain proportion of the component of value present in the adsorber to be regenerated in the already regenerated adsorber.

In a further embodiment, with the aid of the membrane unit, a first low-helium pressurized retentate stream is produced from the prepurified feed gas at a first membrane separation stage and a second low-helium pressurized retentate stream is produced at a second membrane separation stage, the latter being supplied to the prepurifying unit.

The membrane unit may have any number of membrane separation stages, for example two. The retentate stream from each membrane separation stage can be sent to the PP PSA unit. For example, the retentate stream from the last membrane separation stage is sent to the PP PSA unit.

In a further embodiment, a first helium-rich permeate stream is produced at the first membrane separation stage and is fed to an He PSA device of the membrane unit for splitting-off of a helium-rich product gas stream.

The first permeate stream may have a helium content of more than 30 percent by volume. The He PSA device is preferably set up to separate the first permeate stream into the high-purity product gas stream and a purge gas stream by means of helium pressure swing adsorption (He PSA). The product gas stream may have a helium content exceeding 99.0 percent by volume.

In a further embodiment, the first helium-rich permeate stream, before being fed to the He PSA device, is compressed with the aid of a first compressor.

The first compressor is optional. In this way, it is possible to raise the pressure level of the first permeate stream to a value suitable for the He PSA device.

In a further embodiment, a second helium-rich permeate stream is produced at the second membrane separation stage and is fed back to the first membrane separation stage together with a purge gas stream from the He PSA device.

The pressure of the permeate streams is lower than that of the retentate streams. For example, the permeate streams may each have a pressure of about 2 bara. The purge gas stream of the He PSA device preferably has a pressure of 1.5 bara.

In a further embodiment, the second helium-rich permeate stream and the purge gas stream from the He PSA device are compressed together with the aid of a second compressor before being fed to the first membrane separation stage.

In this way, the pressure of the mixture of permeate and purge gas can be raised back to the pressure level of the prepurified feed gas stream.

Additionally, proposed is an industrial plant, especially for performance of such a method, for obtaining helium from a helium-containing feed gas. The industrial plant comprises a prepurifying unit set up to remove undesirable components from the helium-containing feed gas with the aid of a pressure swing adsorption process, in order to obtain a prepurified feed gas, a membrane unit which is connected downstream of the prepurifying unit and has at least one membrane which is more readily permeable to helium than to at least one further component present in the prepurified feed gas, in order to produce a pressurized low-helium retentate stream that has not passed through the at least one membrane, wherein the prepurifying unit includes several adsorbers and several valves which are switchable such that, with the aid of the pressurized low-helium retentate stream, helium-rich gas is displaceable from an adsorber to be regenerated into an already regenerated adsorber.

The embodiments and features described for the method proposed apply correspondingly to the industrial plant proposed.

More particularly, the membrane unit has a plurality of membrane separation stages, the pressurized low-helium retentate stream preferably being drawn off from the last membrane separation stage. The PP PSA unit may have a multitude of adsorbers, for example four to sixteen. In a particularly preferred embodiment, however, the PP PSA unit has six adsorbers. The adsorbers are connected to one another and are operated in a defined cycle scheme.

Further possible implementations of the method and/or the industrial plant also include combinations of features or embodiments described above or hereinafter with regard to the working examples that have not been specified explicitly. The person skilled in the art will also add individual aspects as improvements or supplementations to the respective basic form of the method and/or the industrial plant.

Further advantageous configurations and aspects of the method and/or the industrial plant are the subject of the working examples of the method and/or the industrial plant described hereinafter. The method and/or the industrial plant are elucidated in detail hereinafter using preferred embodiments with reference to the appended figures.

BRIEF DESCRIPTION OF THE DRAWINGS

FIG. 3 shows an embodiment of a cycle scheme for the prepurifying unit according to FIG. 2.

In the figures, elements that are identical or have the same function have been given the same reference numerals, unless stated otherwise.

FIG. 1 shows a schematic view of an industrial plant 1. More particularly, the plant 1 is a plant for obtaining helium. With the aid of the plant 1, it is possible to obtain the product component, for example helium, with high purity from a feed gas or feed gas stream 2 which is at high pressure and comprises, as well as the product component, at least one component that permeates less well through a membrane, for example nitrogen. More particularly, the feed gas stream 2 may comprise nitrogen, helium, higher hydrocarbons, water, hydrogen sulphide and carbon dioxide. The feed gas stream 2 may be a natural gas stream. The feed gas stream 2 may have a pressure of 40 bara. The preferred pressure range for the feed gas stream 2 is between 10 and 60 bara.

Figure 1:
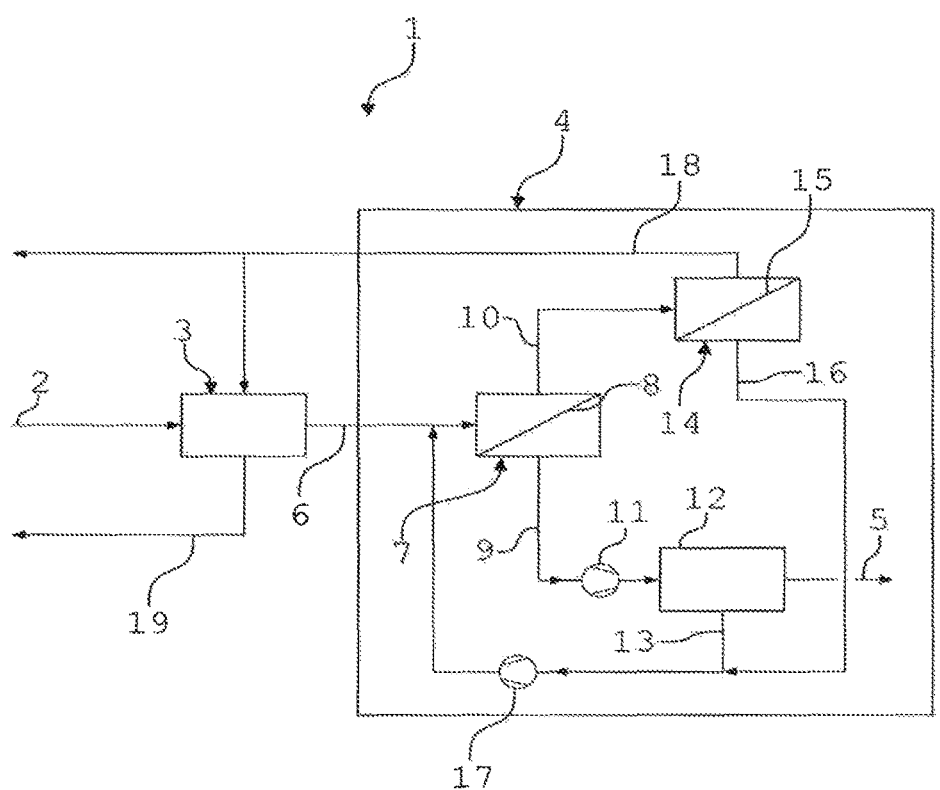
FIG. 1 shows a schematic view of an embodiment of an industrial plant for obtaining helium from a helium-containing feed gas.

The plant 1 comprises a prepurifying unit 3 for performance of a prepurifying pressure swing adsorption method (PP PSA). Therefore, the prepurifying unit 3, as already mentioned above, can also be referred to as PP PSA unit. The prepurifying unit 3 is set up to pretreat the feed gas stream 2 for removal of undesirable components, for example higher hydrocarbons, water, hydrogen sulphide and carbon dioxide, such that the pretreated feed gas stream 2 can be processed in a membrane unit 4 and the product component can be obtained and purified. With the aid of the prepurifying unit 3, all the aforementioned undesirable components are separated from the feed gas stream 2. The pretreatment of the feed gas stream 2 is thus effected in just a single method step. As a result of this, it is possible to dispense with the use of standard and complex pretreatment steps, for example scrubbing of the feed gas stream 2, the performance of a TSA or the use of a cryogenic unit.

The membrane unit 4 is especially set up here to conduct a membrane method or else a combined membrane-pressure swing adsorption method to obtain and purify the product component. The product component may be present at an exit of the membrane unit 4 as a high-pressure component or else as a low-pressure component, according to the configuration of the membrane unit 4 as a pure membrane unit or as a combined membrane-pressure swing adsorption unit. For example, it is thus possible to achieve a high-purity product gas stream 5 with a helium content of more than 99.0 percent by volume.

The feed gas stream 2 at high pressure is guided into the prepurifying unit 3. As elucidated above, the undesirable components are removed therein. The prepurified feed gas obtained or the prepurified feed gas stream 6 obtained, which may comprise essentially nitrogen and helium, is then separated in a first membrane separation stage 7 with the aid of a membrane 8 into a helium-enriched first permeate or into a helium-enriched first permeate stream 9, which comprises, for example, nitrogen and helium with a helium content of more than 30 percent by volume, and a helium-depleted first retentate or a helium-depleted first retentate stream 10, which likewise comprises helium and nitrogen. The retentate from the first membrane separation stage 7 may have a pressure of about 38 bara. Permeate is understood to mean the proportion of the prepurified feed gas stream 6 which passes through the membrane 8, and retentate to mean the proportion of the prepurified feed gas stream 6 which is retained by the membrane 8.

The helium-enriched first permeate stream 9 is compressed with the aid of an optional first compressor 11 and fed to an He PSA device 12 (helium pressure swing adsorption). The He PSA device 12 is set up to separate the first permeate stream 9 by means of pressure swing adsorption into the high-purity product gas stream 5 and a purge gas stream 13. The membrane unit 4 comprises the He PSA device 12.

In a second membrane separation stage 14, a second permeate or a second permeate stream 16 is separated from the first retentate stream 10 from the first membrane separation stage 7 with the aid of a membrane 15. The second permeate stream 16 contains helium and nitrogen and may have a pressure of about 2 bara. This second permeate stream 16 is mixed with the purge gas stream 13 from the He PSA device 12 and compressed by means of a second compressor 17 to a higher pressure, for example to 39 bara. This compressed mixture is fed back to the prepurified feed gas stream 6 upstream of the first membrane separation stage 7. A low-helium second retentate or a low-helium second retentate stream 18 comprising essentially nitrogen from the second membrane separation stage 14 is discharged from the process and can be utilized for the increase in purity, capacity and helium yield in the prepurifying unit 3 or flared off. The second retentate stream 18 may have a pressure of about 37 bara. By freeing the feed gas stream 2 of the undesirable components with the aid of the prepurifying unit 3, damage to the membranes 8, 15 is ruled out.

Firstly, the second membrane separation stage 14 is responsible to an essential degree for the helium yield of the method described. Here, a majority of the helium from the first retentate stream 10 from the first membrane separation stage 7 is separated as the second permeate stream 16 and recycled together with the purge gas stream 13 to the He PSA device 12. Furthermore, the helium yield of the prepurifying unit 3 in particular is also crucial for the helium yield of the plant 1. The use of the second retentate stream 18 from the second membrane separation stage 14 can raise the helium yield from the prepurifying unit 3 to very high values.

The recycling of the purge gas stream 13 from the He PSA device 12 and the second permeate stream 16 from the second membrane separation stage 14 leads to enrichment of the helium in the circuit. The embodiment of the membrane unit 4 shown in FIG. 1 is merely illustrative. It is also possible for more or fewer than two membrane separation stages 7, 14 to be provided. What is important is merely that the membrane unit 4 delivers a retentate stream 18 which is under high pressure and has been essentially freed of undesirable components. At the same time, certain concentrations that are admissible or acceptable for the membranes 8, 15 may be present in the prepurified feed gas stream 6. This means that it is also possible for corresponding concentrations of the undesirable components to be present in the second retentate stream 18.

Known PSA methods or else simply PSA for short (pressure swing adsorption) entail a non-negligible loss of the product component, for example helium. Typically, however, high yields of the product component are required. In order to achieve this, in the present case, the prepurifying unit 3 is therefore operated with an additional method step, which enables a very high yield of the product component. This means that the losses of the product component are reduced to a minimum. The additional method step comprises the use of the highly pressurized second retentate stream 18 of the component that permeates less well, for example nitrogen, which is obtained on the retentate side of the second membrane separation stage 14. At least a substream of this second retentate stream 18 is used in the additional method step in order to reduce the losses of the product component via the prepurifying unit 3 to a minimum.

In the case of membrane plants which do not require a high yield of the product component, it is possible through the use of this additional method step and the associated very high yield of the product component via the prepurifying unit 3 to execute the membrane plant in a less costly manner, since virtually the entire loss of the product component can occur via the membrane plant.

The second retentate stream 18 from the second or last membrane separation stage 14 contains a certain proportion of the product component, namely that which has not been removed via the membranes 8, 15 and hence constitutes the yield loss from the membrane unit 4. The second retentate stream 18 from the last membrane stage 14 is to be used for the additional method step in the prepurifying unit 3, as a result of which, in addition, at least partial recovery of the product component present in the second retentate stream 18 is achieved and hence the overall yield of the plant 1 is increased once again.

Through the use of the prepurifying unit 3, the pretreatment of the feed gas stream 2 is effected in just a single method step, which makes it possible to dispense with the use of customary and complex pretreatment steps. Through the use of the retentate stream 10, 18 from one or more membrane separation stages 7, 14 in the prepurifying unit 3, it is possible to reduce the losses of the product component via the prepurifying unit 3 to a minimum, and they are thus within the same order of magnitude as in the case of known methods, albeit very complex and costly methods, of pretreatment of the feed gas stream 2, for example scrubbing, TSA or the use of a cryogenic unit. By using the second retentate stream 18 in the prepurifying unit 3, in addition, at least partial recovery of the product component present in the retentate and hence an increase in the overall yield are achieved.

An of gas stream or undesirable component stream 19 separated from the feed gas stream 2 is conducted away from the prepurifying unit 3. In principle, it is possible to use the retentate stream 10, 18 from every membrane separation stage 7, 14; it is not absolutely necessary to use the second retentate stream 18 from the last membrane separation stage 14. Furthermore, it is not necessary to use the respective entire retentate stream 10, 18; instead, it is also possible to use just a substream of the respective retentate stream 10, 18.

Figure 2:
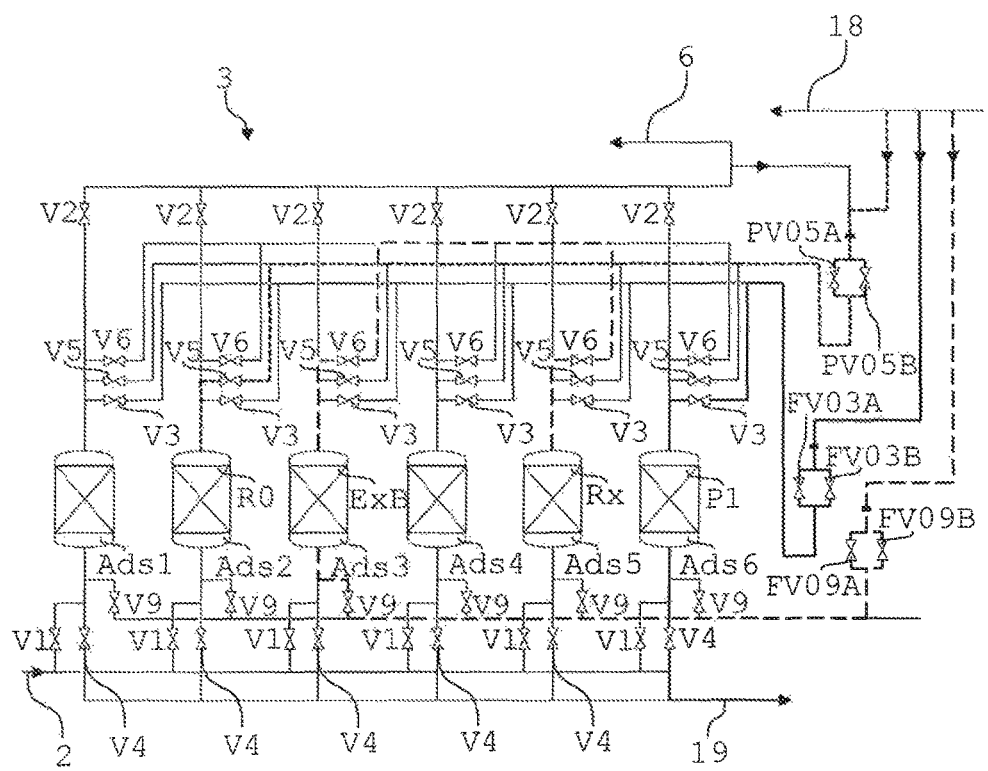
FIG. 2 shows a schematic view of an embodiment of a prepurifying unit for the plant according to FIG. 1.

FIG. 2 shows a schematic detailed view of an illustrative embodiment of such a prepurifying unit 3. The prepurifying unit 3 has any desired number of adsorbers Ads1 to Ads6. For example, six adsorbers Ads1 to Ads6 are provided.

However, it is also possible for four to sixteen adsorbers Ads1 to Ads6 of this kind to be provided. With the aid of the six adsorbers Ads1 to Ads6, what is called a 6-bed process is possible. Each adsorber Ads1 to Ads6 has several dedicated valves V1 to V6 and V9. In addition, the prepurifying unit 3 comprises valve groups FV03A, FV03B, FV09A, FV09B, PV05A and PV05B. It is also possible to use more or fewer valves and valve groups, according to the number of adsorbers Ads1 to Ads6 and the PSA system chosen. It is additionally also possible to execute the valve groups FV03A, FV03B, FV09A, FV09B, PV05A and PV05B with just a single valve in each case.

In a standard PSA method, specific porous materials such as zeolites or activated carbon are used as adsorbent in the adsorbers.

Figure 4:
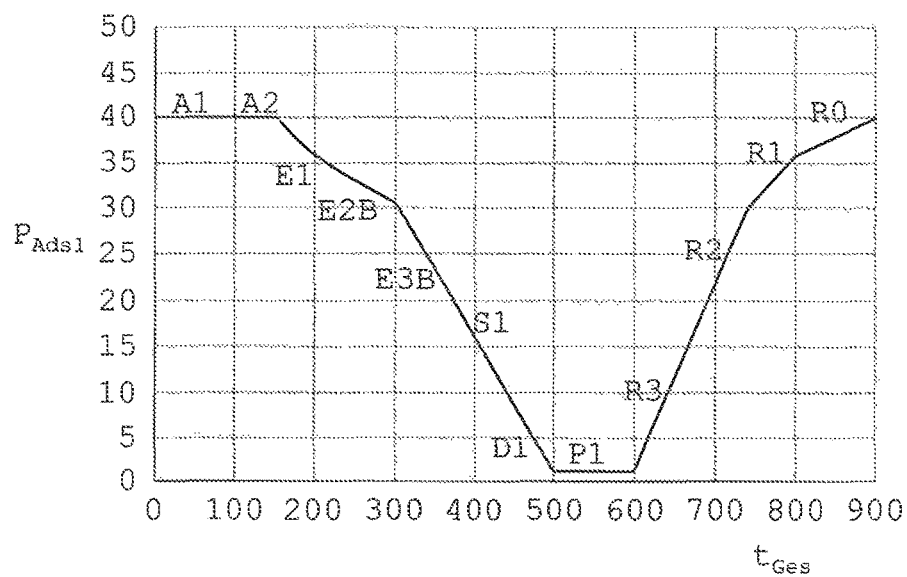
FIG. 4 shows an embodiment of a pressure profile of an adsorber of the prepurifying unit according to FIG. 2.

The improved PP PSA method, which can be conducted with the aid of the prepurifying unit 3 shown in FIG. 2, is elucidated hereinafter with reference to FIG. 2, FIG. 3 and FIG. 4. FIG. 3 shows an illustrative cycle scheme for operating the prepurifying unit 3, and FIG. 4 shows, by way of example, a pressure profile of the first adsorber Ads1.

As shown by FIG. 3, the cycle scheme comprises a multitude of PSA sequences, namely the PSA sequences A1, A2, E1, E2B, E3B, S1, D1, P1, R3, R2, R1 and R0. The adsorbers Ads1 to Ads6 can accordingly also be referred to as A1, A2, E1, E2B, E3B, S1, D1, P1, R3, R2, R1 and R0, according to the PSA sequence in which they are present. In FIG. 3, the adsorbers Ads1 to Ads6 are plotted in vertical direction, and the PSA sequences A1, A2, E1, E2B, E3B, S1, D1, P1, R3, R2, R1 and R0 in horizontal direction. Additionally, plotted below this cycle scheme are the respective time $t_{PSA}$ for a PSA sequence in seconds and the total time $t_{Ges}$ for the 6-bed process in seconds. Also shown in FIG. 3 are the final pressures $p_{Ads1}$ to $p_{Ads6}$ that exist in the adsorbers Ads1 to Ads6 in the respective PSA sequences A1, A2, E1, E2B, E3B, S1, D1, P1, R3, R2, R1 and R0, in bara. The cycle scheme comprises twelve cycles T1 to T12. When all twelve cycles T1 to T12 have been conducted after the time $t_{Ges}$, the 6-bed process begins from the start, i.e. with cycle T1 again.

The individual PSA sequences A1, A2, E1, E2B, E3B, S1, D1, P1, R3, R2, R1 and R0 are briefly elucidated hereinafter. The preferably identical PSA sequences A1 and A2 each comprise adsorption at high pressure. In this case, the feed gas stream 2 (component of value+undesirable components) flows via the respective valve V1 into the respective adsorber Ads1 to Ads6. The undesirable components (=well-adsorbing components) are adsorbed on the adsorbent and the component of value (=less well-adsorbing component), helium in this case, and nitrogen flow away at the head of the adsorber via the respective valve V2 as prepurified feed gas stream 6. For example, the adsorber Ads1 is run with the PSA sequence A1 (see first column "Cycle T1" of FIG. 3) in cycle T1, and with the PSA sequence A2 (see second column "Cycle T2" of FIG. 3) in cycle T2.

In the PSA sequence E1/R1, a first equalization of pressure is conducted. The PSA sequences E1 and R1 are always executed together, meaning that two of the adsorbers Ads1 to Ads6 are connected. At the end of the adsorption, i.e. after the PSA sequence A1, A2, a significant proportion of the component of value is still present in the adsorber to be regenerated, and this proportion should as far as possible not be lost but be recovered, in order to increase the yield of the PSA method. For this purpose, the E1 adsorber—in the case of cycle T1 the adsorber Ads6—releases gas via the valve V5 overhead to the R1 adsorber—in the case of cycle T1 the adsorber Ads2, and the R1 adsorber Ads2 here also has its valve V5 open and hence stores a certain proportion of the component of value present at the top of the E1 adsorber Ads6 in the R1 adsorber Ads2.

In the PSA sequence E2B/R2, an equalization of pressure is conducted with bulk phase displacement. The PSA sequences E2B and R2 are always executed together, meaning that two of the adsorbers Ads1 to Ads6 are connected. After the PSA sequence E1/R1 as well, a significant proportion of the component of value is still present in the adsorber to be regenerated. If at all possible, this proportion should be recovered completely in order to increase the yield of the PSA method. For this purpose, the E2B adsorber—in the case of cycle T2 the adsorber Ads6—releases gas via the valve V6 overhead to the R2 adsorber—in the case of cycle T2 the adsorber Ads3, and the R2 adsorber Ads3 here also has its valve V6 open and hence stores a certain proportion of the component of value present at the top of the adsorber in the R2 adsorber Ads3. This arrangement describes a standard equalization of pressure (E adsorber releases gas to R adsorber) as also possessed by known PSA methods.

In addition, during the E2B/R2 sequence, retentate gas (preferably nitrogen) from the second retentate stream 18 is guided via the valve groups FV09A and FV09B and the valve V9 from below into the E2B adsorber Ads6, and hence the component of value from the E2B adsorber Ads6 is pushed into and stored in the R2 adsorber Ads3. By way of example, FIG. 2 shows the increase in pressure in an R2 adsorber Ads5 with the aid of an E2B adsorber Ads3 and of the second retentate stream 18 with the aid of a line of long bold dashes.

The PSA sequence E3B/R3 is analogous to the PSA sequence E2B/R2 for an equalization of pressure with bulk phase displacement. The E3B adsorber in cycle T1 is the adsorber Ads5, and the R3 adsorber in cycle T1 is the adsorber Ads3. At the end of the PSA sequence E3B, a very high proportion of the component of value which was still present in the E3B adsorber Ads5 at the end of the adsorption phase has been stored from the E3B adsorber Ads5 in the R3 adsorber Ads3, which minimizes the loss of the component of value and hence maximizes the yield of the component of value. It is not just the helium that is displaced from the top of the adsorber here, but the helium from the entire adsorber. Typically, at the end of the adsorption, a helium feed gas concentration is present in the lower region of the adsorber, and helium-richer gas having a higher helium concentration at the top of the adsorber.

The PSA sequence S1/P1 comprises the providing of purge gas. The S1 adsorber—in the case of cycle T2 the adsorber Ads5—releases gas via the valve V3 overhead to the P1 adsorber—in the case of cycle T2 the adsorber Ads4, and the P1 adsorber Ads4 here has its valve V3 and its valve V4 open. Gas released by the S1 adsorber Ads5 flows through and hence purges the P1 adsorber Ads4, i.e. regenerates it. The undesirable components are desorbed here from the adsorbent surface and are released together with the purge gas via the valve V4 in the undesirable component stream 19. Optionally, at the top of the P1 adsorber Ads4, it is additionally or exclusively possible for retentate gas, especially nitrogen, from the second retentate stream 18 to be fed in via the valve groups FV03A and FV03B, and hence for the P1 adsorber Ads4 to be purged even more effectively. By way of example, the purging of a P1 adsorber Ads5 with the aid of the second retentate stream 18 is shown in FIG. 2 with the aid of a bold continuous line.

The PSA sequence D1 (D=dump) describes the release of the residual gas into the undesirable component stream 19. In this case, the remaining gas is not used any further for the PSA method in the D1 adsorber—in the case of cycle T1 the adsorber Ads4—but released into the undesirable component stream 19 via the opened valve V4.

The PSA sequence R0 describes a last pressure increase cycle. The R0 adsorber—in the case of cycle T2 the adsorber Ads2—is pressurized to high pressure with PSA product gas from the prepurified feed gas stream 6 via the valves PV05A and PV05B and the valve V5 of the R0 adsorber Ads2 overhead. The R0 adsorber Ads2 can then restart the adsorption phase and go through the PSA cycle again. Optionally, as shown in FIG. 2 with the aid of a line of short bold dashes, the R0 adsorber, in this case the adsorber Ads2, can also be pressurized with retentate gas (nitrogen) from the second retentate stream 18. In this case, the valves PV05A and PV05B would not be connected to the prepurified feed gas stream 6, but to the second retentate stream 18. The last pressure increase cycle R0 can also be effected via other valves, for example via the valve groups FV03A, FV03B, FV09A, FV09B. In addition, the last pressure increase cycle can also be effected with feed gas via the valve V1.

An illustrative pressure profile of the adsorber Ads1 is shown in FIG. 4, wherein the time $t_{Ges}$ is plotted on the horizontal axis and the final pressure $p_{Ads1}$ of the adsorber Ads1 in bara on the vertical axis. This pressure profile corresponds to cycles T1 to T12 of the adsorber Ads1. First of all, the PSA sequences A1 and A2 are conducted at a high final pressure $p_{Ads1}$ of 40 bara. The feed gas stream 2 is freed here of the undesirable components adsorbed on the adsorbent. After cycle A2, the adsorber Ads1 is fully laden and has to be regenerated.

In the subsequent PSA sequence E1 in which the adsorber Ads3 acts as R1 adsorber (cycle T3 of FIG. 3), a first equalization of pressure is conducted. In order to be able to recover the component of value still present after the PSA sequences A1 and A2, the E1 adsorber Ads1 releases gas via the opened valves V5 overhead to the R1 adsorber Ads3. In the PSA sequence E2B, the adsorber Ads1 releases gas via the opened valves V6 overhead to the R2 adsorber Ads 4 (cycle T4 of FIG. 3). In addition, it is now possible to guide retentate gas from the second retentate stream 18 via the valve groups FV09A and FV09B via the valve V9 from below into the E2B adsorber Ads1, in order to push a first portion of the component of value present in the E2B adsorber Ads1 into the R2 adsorber Ads4.

The PSA sequence E2B is followed in cycle T5 by the PSA sequence E3B. The adsorber Ads5 here is the corresponding R3 adsorber (cycle T5 of FIG. 3) of the E3B adsorber Ads1. At the end of the PSA sequence E3B, a very high proportion of the component of value which was still present in the adsorber Ads1 at the end of the adsorption phase (PSA sequences A1 and A2) has been stored in the R adsorbers Ads4 and Ads5.

In the subsequent PSA sequence S1, the S1 adsorber Ads1 releases gas via the opened valve V5 overhead to the P1 adsorber Ads6 (cycle T6 of FIG. 3). The P1 adsorber Ads6 has its valves V3 and V4 open here. The P1 adsorber Ads6 is thus purged and regenerated with gas from the S1 adsorber Ads1. In the PSA sequence D1 (cycle T7 of FIG. 3), the gas remaining in the D1 adsorber Ads1 is fed via the valve V4 to the undesirable component stream 19. As apparent in FIG. 4, the adsorber Ads1 is now virtually at ambient pressure.

The PSA sequence D1 is followed, in cycle T8, by the PSA sequence P1 and hence the regeneration of the adsorber Ads1. Gas is released here from the S1 adsorber Ads2 via the opened valves V3 overhead to the P1 adsorber Ads1 which has its valve V4 open here, in order to feed the purge gas to the undesirable component stream 19. In addition, retentate gas from the second retentate stream 18 can be supplied additionally or exclusively at the top of the P1 adsorber Ads1 via the valve groups FV03A and FV03B, in order to purge it even more effectively.

The pressure is equalized in the subsequent PSA sequences R3 and R2. The adsorber Ads3 here is the E3B adsorber (cycle T9 of FIG. 3), and the adsorber Ads4 is the E2B adsorber (cycle T10 of FIG. 3). The E3B adsorber Ads3 and the E2B adsorber Ads4 each successively release gas by means of the opened valve V6 overhead to the R3 or R2 adsorber Ads1 which then likewise has its valve V6 open. The gas contains a significant portion of component of value which is to be recovered. In addition, retentate gas from the second retentate stream 18 is guided via the valve groups FV09A and FV09B and the respective valve V9 into the E3B adsorber Ads3 and the E2B adsorber Ads4, by means of which the component of value is guided into the adsorber Ads1 and, as shown in FIG. 4, an increase in pressure is achieved therein. It is particularly advantageous here that the second retentate stream 18 is firstly at a high pressure and secondly has a low level of undesirable components and comprises essentially nitrogen. It is thus possible to dispense with a compressor for increasing the pressure. The undesirable components need not be separated completely from the feed gas 2 in the prepurifying unit 3. More particularly, a breakthrough of the undesirable components is in principle possible and permissible if the concentrations thereof do not lead to any impairment of the membrane unit 4. It is thus also possible for a certain proportion of undesirable components to be present in each retentate stream 10, 18, especially in the second retentate stream 18, i.e. in that which is used for the prepurifying unit 3.

In the subsequent PSA sequence R1, the adsorber Ads5 is the E1 adsorber (cycle T11 of FIG. 3). The E1 adsorber Ads5, which is no longer adsorptive and hence still has a significant proportion of component of value at the top of the adsorber, releases gas to the regenerated R1 adsorber Ads1 via the opened valves V5. The component of value from the E1 adsorber Ads5 is stored in the R1 adsorber Ads1.

In cycle T12, in the PSA sequence R0, the adsorber Ads1 is compressed to high pressure with PSA product gas from the prepurified feed gas stream 6 via the opened valves PV05A, PV05B and V5. The final pressure $p_{Ads1}$ is then, as at the start of the PSA cycle, again 40 bara. The adsorber Ads1 can then restart the adsorption phase (cycle T1 of FIG. 3) and go through the PSA cycle again. Optionally, the R0 adsorber Ads1 can also be pressurized with retentate gas from the second retentate stream 18.

Figure 5:
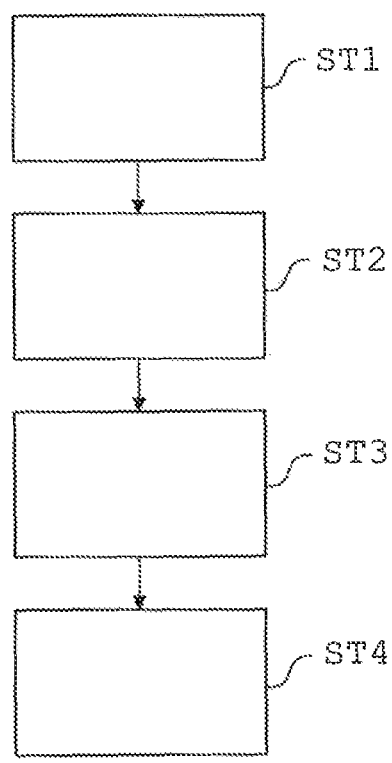
FIG. 5 shows a schematic block diagram of an embodiment of a method of obtaining helium from a helium-containing feed gas.

A method of obtaining helium from the helium-containing feed gas 2 shown in schematic form in FIG. 5 comprises several steps ST1 to ST4. In a step ST1, the helium-containing feed gas 2 is fed to the prepurifying unit 3, with removal of undesirable components from the helium-containing feed gas 2 in a pressure swing adsorption process with the aid of the prepurifying unit 3, in order to obtain the prepurified feed gas 6. In a subsequent step ST2, the prepurified feed gas 6 is fed to the membrane unit 4 which is connected downstream of the prepurifying unit 3 and has at least one membrane 8, 15 which is more readily permeable to helium than to at least one further component present in the prepurified feed gas 6, for example nitrogen.

In a further step ST3, the pressurized second retentate stream 18 that has not passed through the at least one membrane 8, is guided to the prepurifying unit 3. In a step ST4, with the aid of the pressurized retentate stream 18, helium-rich gas is displaced from an adsorber E2B, E3B to be regenerated in the prepurifying unit 3 into an already regenerated adsorber R2, R3 of the prepurifying unit 3.

By pushing the component of value present in the no longer adsorptive E1 adsorber, E2B adsorber and E3B adsorber into the adsorptive R adsorber in the PSA sequences E1/R1, E2B/R2 and E3B/R3, it is possible to produce the product gas with a particularly high yield of the component of value. Through the use of the retentate gas at a high pressure from the second retentate stream 18 for displacement of the component of value into the R adsorber and to increase the pressure, it is possible to dispense with a compressor for increasing the pressure. In addition, it is also possible to obtain the amount of helium still present in the second retentate stream 18.

Although the present invention has been described using working examples, it is modifiable in various ways.

REFERENCE SYMBOLS USED 1 industrial plant
2 feed gas stream/feed gas
3 prepurifying unit
4 membrane unit
5 product gas stream
6 prepurified feed gas stream/prepurified feed gas
7 first membrane separation stage
8 membrane
9 first permeate stream/first permeate
10 first retentate stream/first retentate
11 first compressor
12 He PSA device
13 purge gas stream
14 second membrane separation stage
15 membrane
16 second permeate stream/second permeate
17 second compressor
18 second retentate stream/second retentate
19 undesirable component stream
Ads1 adsorber
Ads2 adsorber
Ads3 adsorber
Ads4 adsorber
Ads5 adsorber
Ads6 adsorber
A1 PSA sequence/adsorber
A2 PSA sequence/adsorber
D1 PSA sequence/adsorber
E1 PSA sequence/adsorber
E2B PSA sequence/adsorber
E3B PSA sequence/adsorber
FV03A valve group
FV09A valve group
FV03B valve group
FV09B valve group
PV05A valve group
PV05B valve group
R0 PSA sequence/adsorber
R1 PSA sequence/adsorber
R2 PSA sequence/adsorber
R3 PSA sequence/adsorber
$p_{Ads1}$ final pressure
$p_{Ads2}$ final pressure
$p_{Ads3}$ final pressure
$p_{Ads4}$ final pressure
$p_{Ads5}$ final pressure
$p_{Ads6}$ final pressure
P1 PSA sequence/adsorber
S1 PSA sequence/adsorber
ST1 step
ST2 step
ST3 step
ST4 step
$t_{Ges}$ time
$t_{PSA}$ time
T1 cycle
T2 cycle
T3 cycle
T4 cycle
T5 cycle
T6 cycle
T7 cycle
T8 cycle
T9 cycle
T10 cycle
T11 cycle
T12 cycle
V1 valve
V2 valve
V3 valve
V4 valve
V5 valve
V6 valve
V9 valve

The invention claimed is:

1. A method for obtaining helium from a helium-containing feed gas, said method comprising:
feeding the helium-containing feed gas to a prepurifying unit wherein undesirable components are removed from the helium-containing feed gas in a pressure swing adsorption process to obtain a prepurified feed gas;
feeding the prepurified feed gas to a membrane unit connected downstream of the prepurifying unit, said membrane unit having at least one membrane which is more permeable to helium than to at least one further component present in the prepurified feed gas, to produce a pressurized low-helium retentate stream;
feeding said pressurized low-helium retentate stream from the membrane unit to the prepurifying unit; and
displacing helium-rich gas with the aid of the pressurized low-helium retentate stream from an adsorber to be regenerated in the prepurifying unit into an already regenerated adsorber of the prepurifying unit.

2. The method according to claim 1, wherein said membrane unit has a first membrane separation stage, which produces a first permeate stream and said first permeate stream is fed to a helium pressure swing adsorption device, and wherein said first permeate stream is purified in said helium pressure swing adsorption device to a purity of helium of greater than 99.0 percent by volume.

3. The method according to claim 1, wherein the pressurized low-helium retentate stream has a pressure of 35 to 40 bara.

4. The method according to claim 1, wherein the pressurized low-helium retentate stream is a nitrogen-rich stream.

5. The method according to claim 1, wherein the at least one further component present in the prepurified feed gas is nitrogen.

6. The method according to claim 1, wherein the undesirable components comprise carbon dioxide, higher hydrocarbons, sulphur dioxide and/or water.

7. The method according to claim 1, wherein the pressurized low-helium retentate stream is used to regenerate an adsorber to be regenerated in the prepurifying unit and/or wherein the pressurized low-helium retentate stream is used to increase the pressure in an adsorber to be pressurized in the prepurifying unit.

8. The method according to claim 1, wherein only a substream of the pressurized low-helium retentate stream is fed to the prepurifying unit.

9. The method according to claim 1, wherein the displacement of the helium-rich gas with the aid of the pressurized low-helium retentate stream is preceded by release of helium-rich gas from said adsorber to be regenerated to an already regenerated adsorber.

10. The method according to claim 1, wherein said membrane unit comprises a first separation stage and a second membrane separation stage, and said membrane unit produces a first permeate stream and a first low-helium pressurized retentate stream from the prepurified feed gas in said first membrane separation stage and produces a second low-helium pressurized retentate stream from the first low-helium pressurized retentate stream in said second membrane separation stage, wherein said second low-helium pressurized retentate stream is the low-helium pressurized retentate stream fed to the prepurifying unit.

11. The method according to claim 10, wherein a first helium-rich permeate stream is produced in said first membrane separation stage and said first helium-rich permeate stream is fed to a helium pressure swing adsorption device of the membrane unit to produce a helium-rich product gas stream.

12. The method according to claim 11, wherein the first helium-rich permeate stream, before being fed to the helium pressure swing adsorption device, is compressed with the aid of a first compressor.

13. The method according to claim 11, wherein a second helium-rich permeate stream is produced in said second membrane separation stage and said second helium-rich permeate stream is fed back to the first membrane separation stage together with a purge gas stream from the helium pressure swing adsorption device.

14. The method according to claim 13, wherein the second helium-rich permeate stream and the purge gas stream from the helium pressure swing adsorption device are compressed together with the aid of a second compressor before being fed to the first membrane separation stage.

15. A plant for obtaining helium from a helium-containing feed gas, said plant comprising:
  a prepurifying unit having a pressure swing adsorption stage for removing undesirable components from the helium-containing feed gas and thereby to obtain a prepurified feed gas,
  a membrane unit connected downstream of the prepurifying unit said unit having and has at least one membrane which is more permeable to helium than to at least one further component present in the prepurified feed gas, for producing a pressurized low-helium retentate stream, and
  a line for introducing the pressurized low-helium retentate stream into the prepurifying unit,
  wherein the prepurifying unit comprises a plurality of adsorbers and a plurality of valve groups which are switchable via which the pressurized low-helium retentate stream can be used to displace helium-rich gas from an adsorber to be regenerated into an already regenerated adsorber.

16. The method according to claim 1, wherein the pressurized low-helium retentate stream has a pressure of 36 to 39 bara.

17. The method according to claim 1, wherein the pressurized low-helium retentate stream is a methane-rich stream.

18. The method according to claim 1, wherein said membrane unit comprises a first separation stage and a second membrane separation stage, and said membrane unit produces a first helium-rich permeate stream and a first low-helium pressurized retentate stream from the prepurified feed gas in said at a first membrane separation stage and produces a second helium-rich permeate stream and a second low-helium pressurized retentate stream from the first low-helium pressurized retentate stream in said second membrane separation stage,
  wherein said second low-helium pressurized retentate stream is the low-helium pressurized retentate stream fed to the prepurifying unit,
  wherein said said first helium-rich permeate stream is sent to a helium pressure swing adsorption device of the membrane unit to produce a helium-rich product gas stream, and
  wherein said said second helium-rich permeate stream is fed back to the first membrane separation stage.

19. The method according to claim 18, wherein said helium pressure swing adsorption further produces a purge gas which is fed back to the first membrane stage.

20. The method according to claim 18, wherein the first helium-rich permeate stream, before being fed to the helium pressure swing adsorption device, is compressed in a compressor.

21. The method according to claim 19, wherein a said second helium-rich permeate stream is combined with said purge gas, and the combined gas is compressed in a compressor before being is fed back to the first membrane separation stage.

* * * * *